(12) United States Patent
Konada et al.

(10) Patent No.: US 11,958,327 B2
(45) Date of Patent: Apr. 16, 2024

(54) VEHICLE

(71) Applicant: HONDA MOTOR CO., LTD., Tokyo (JP)

(72) Inventors: Kazuya Konada, Wako (JP); Satoshi Ohno, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 154 days.

(21) Appl. No.: 17/670,042

(22) Filed: Feb. 11, 2022

(65) Prior Publication Data

US 2022/0305866 A1 Sep. 29, 2022

(30) Foreign Application Priority Data

Mar. 25, 2021 (JP) ................. 2021-051518

(51) Int. Cl.
*B60G 17/016* (2006.01)
*B60G 17/0165* (2006.01)
(Continued)

(52) U.S. Cl.
CPC ..... *B60G 17/0165* (2013.01); *B60G 17/0195* (2013.01); *B60W 10/22* (2013.01);
(Continued)

(58) Field of Classification Search
CPC ............ B60G 17/0165; B60G 17/0195; B60G 2202/42; B60G 2202/442; B60G 2400/94; B60G 2500/30; B60G 17/0157; B60G 2202/422; B60G 2800/222; B60G 17/019; B60W 10/22; B60W 30/085
See application file for complete search history.

(56) References Cited

U.S. PATENT DOCUMENTS 6,046,511 A * 4/2000 Kincaid ................. B60R 16/03
701/45
2010/0213904 A1* 8/2010 Yamada ................. H02M 1/32
318/400.3
(Continued)

FOREIGN PATENT DOCUMENTS

JP 08301063 A * 11/1996
JP H10-322930 A 12/1998
(Continued)

OTHER PUBLICATIONS

Japanese Office Action dated Nov. 29, 2022 issued in corresponding Japanese application No. 2021-051518; English machine translation included (9 pages).
(Continued)

*Primary Examiner* — Joseph J Dallo
(74) *Attorney, Agent, or Firm* — Rankin, Hill & Clark LLP (57) ABSTRACT

A vehicle includes a collision determination ECU determining whether a possibility of collision is present, based on a detection result of a detection sensor detecting outside of the vehicle, a motor, a boosting circuit and a battery supplying a high voltage to the motor, and an electric suspension control ECU controlling the boosting circuit and the motor, and in a case where the collision determination ECU determines that the possibility of collision is present, the electric suspension control ECU limits the supply of the high voltage to the motor.

7 Claims, 4 Drawing Sheets

(51) Int. Cl.
  *B60G 17/0195* (2006.01)
  *B60W 10/22* (2006.01)
  *B60W 30/085* (2012.01)

(52) U.S. Cl.
  CPC ....... *B60W 30/085* (2013.01); *B60G 2202/42* (2013.01); *B60G 2202/442* (2013.01); *B60G 2400/94* (2013.01); *B60G 2500/30* (2013.01)

(56) References Cited

U.S. PATENT DOCUMENTS

| | | | |
|---|---|---|---|
| 2013/0119957 A1* | 5/2013 | Kung | H02M 3/1582 |
| | | | 323/299 |
| 2015/0088384 A1* | 3/2015 | Darraba | H02P 29/025 |
| | | | 701/45 |
| 2016/0001621 A1 | 1/2016 | Kato | |
| 2019/0109529 A1* | 4/2019 | Nobe | G01R 31/40 |
| 2019/0210652 A1* | 7/2019 | Sawatzki | B60T 7/065 |
| 2021/0402939 A1 | 12/2021 | Obayashi et al. | |
| 2022/0305863 A1* | 9/2022 | Konada | B60G 17/0195 |
| 2022/0305864 A1* | 9/2022 | Konada | B60G 17/0195 |
| 2022/0305866 A1* | 9/2022 | Konada | B60W 10/22 |

FOREIGN PATENT DOCUMENTS

| | | |
|---|---|---|
| JP | 2012-115031 A | 6/2012 |
| JP | 2012-131395 A | 7/2012 |
| JP | 2013-241064 A | 12/2013 |
| JP | 2016-13794 A | 1/2016 |
| JP | 2020-150725 A | 9/2020 |
| JP | 2021-35799 A | 3/2021 |

OTHER PUBLICATIONS

Japanese Office Action dated Apr. 4, 2023 issued in corresponding Japanese application No. 2021-051518; English machine translation included (7 pages).

* cited by examiner

VEHICLE

INCORPORATION BY REFERENCE

The present application claims priority under 35 U.S.C. § 119 to Japanese Patent Application No. 2021-051518 filed on Mar. 25, 2021. The content of the application is incorporated herein by reference in its entirety.

BACKGROUND OF THE INVENTION

Field of the Invention

The present invention relates to a vehicle.

Description of the Related Art

Heretofore, a technology concerning an electric suspension apparatus mounted in a vehicle and driven with a motor has been known.

For example, in an electric suspension apparatus described in Japanese Patent Laid-Open No. 2012-131395, an output voltage (motor drive voltage) of a transformer such as a DC/DC converter which transforms power supplied to a motor of an electric actuator is increased as high as possible in a range of a predetermined voltage (e.g., 48 V) or less, based on laws and regulations.

In an electric suspension apparatus described in Japanese Patent Laid-Open No. 2012-131395, in a case of using a three-phase AC brushless motor, a three-phase AC unit is classified as a high voltage with AC 30 V or more. Also, for ensuring safety of the high voltage during collision of a vehicle, it is necessary to ensure safety of the AC unit, which is not described in Japanese Patent Laid-Open No. 2012-131395.

The present invention is intended to improve safety of a high voltage component of an electric suspension apparatus or the like mounted in a vehicle.

SUMMARY OF THE INVENTION

An aspect of the present invention is a vehicle including a collision determination device determining whether a possibility of collision is present, based on a detection result of a detection sensor detecting outside of the vehicle, a high voltage component, a power source device supplying a high voltage to the high voltage component, and a control device controlling the power source device and the high voltage component, wherein in a case where the collision determination device determines that the possibility of collision is present, the control device limits the supply of the high voltage to the high voltage component.

According to another aspect of the present invention, in the above vehicle, in the case where the collision determination device determines that the possibility of collision is present, the control device limits a voltage supplied to the high voltage component to a predetermined voltage or less.

According to still another aspect of the present invention, in the above vehicle, the high voltage component is a motor driving an electric actuator in an electric suspension apparatus, and the control device short-circuits the motor, after supply of the high voltage to the motor is limited.

According to a further aspect of the present invention, in the above vehicle, the control device releases the limitation of the supply of the high voltage to the high voltage component, in a case where the supply of the high voltage to the high voltage component is limited, and then a predetermined condition is satisfied.

According to a still further aspect of the present invention, in the above vehicle, the predetermined condition includes at least one of a condition that the vehicle runs at a predetermined vehicle speed or more for a predetermined time and a condition that the vehicle runs a predetermined distance.

According to an aspect of the present invention, safety of a high voltage component of an electric suspension apparatus or the like mounted in a vehicle can be improved.

DETAILED DESCRIPTION OF THE PREFERRED EMBODIMENT

Hereinafter, an embodiment of the present invention will be described with reference to the drawings.

[1. Configuration of Electric Suspension Apparatus]

Figure 1:
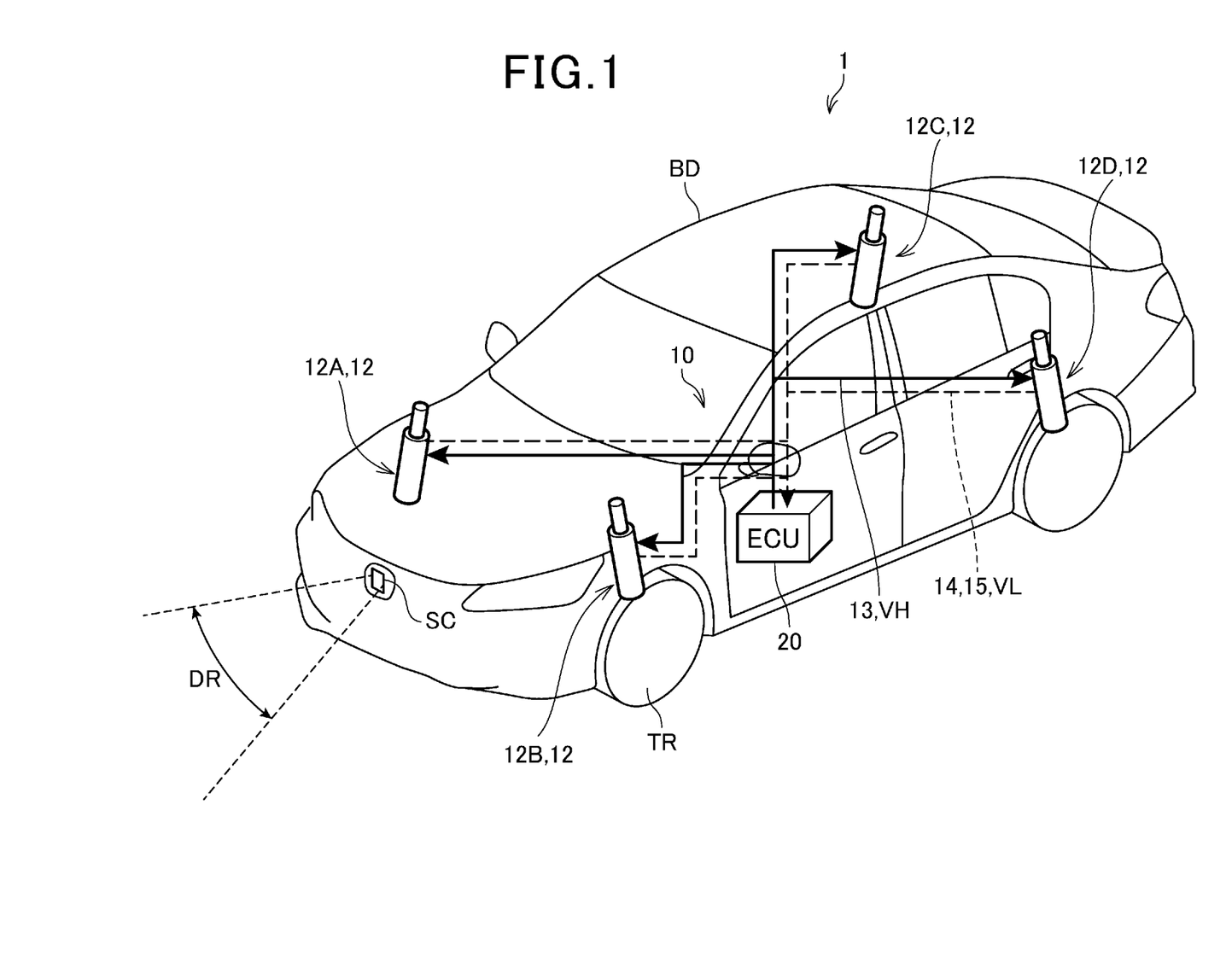
FIG. 1 is a perspective view showing an example of arrangement of an electric suspension apparatus.
Figure 2:
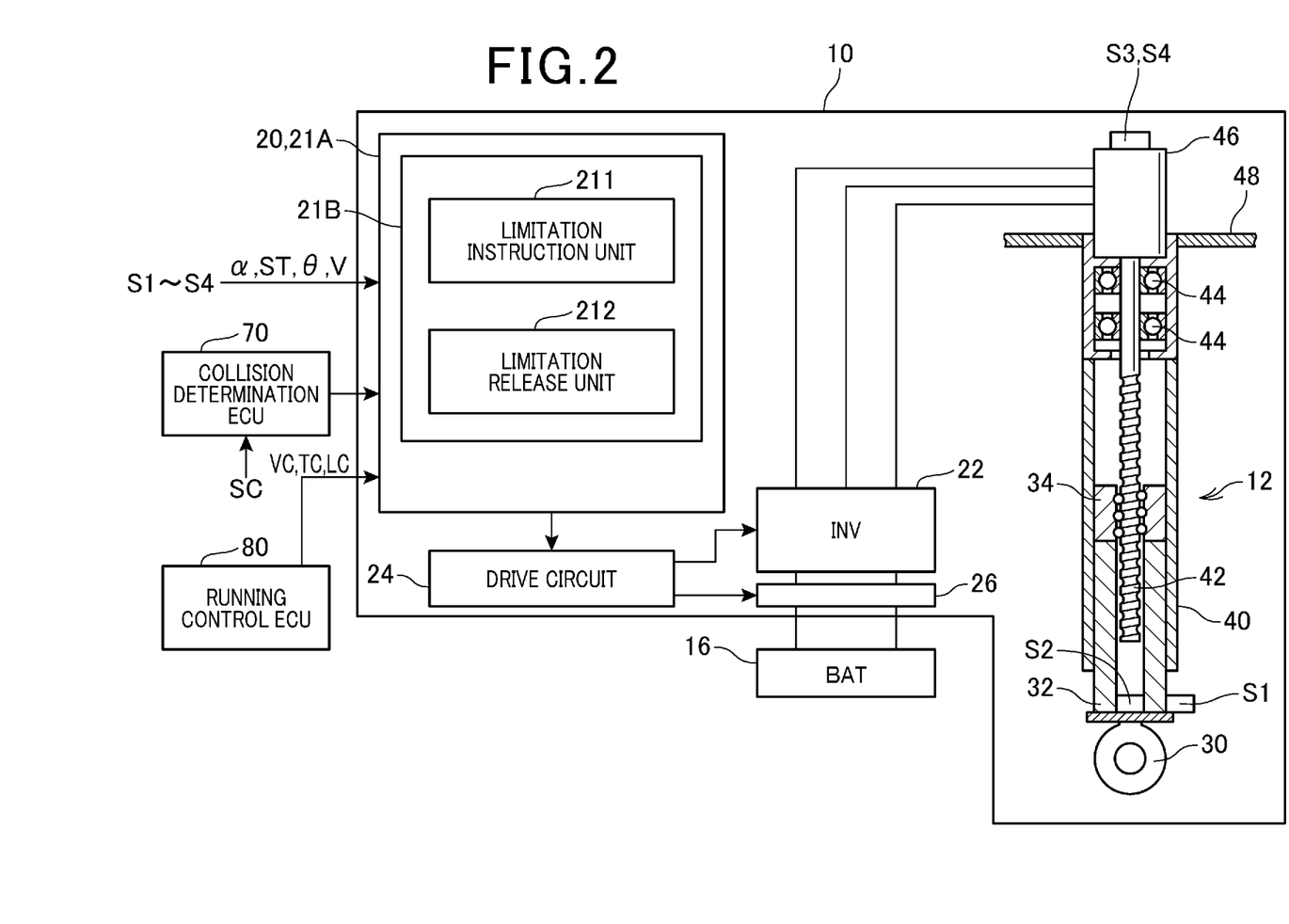
FIG. 2 is a diagram showing an example of a configuration of the electric suspension apparatus.

FIG. 1 is a perspective view showing an example of arrangement of an electric suspension apparatus 10. FIG. 2 is a diagram showing an example of a configuration of the electric suspension apparatus 10.

Description will be made as to the electric suspension apparatus 10 with reference to FIGS. 1 and 2.

As shown in FIG. 1, a vehicle 1 includes a vehicle body BD, four wheels TRs, the electric suspension apparatus 10, and a detection sensor SC. The electric suspension apparatus 10 includes an electric actuator 12 and an electric suspension control ECU 20.

The electric actuator 12 includes a first electric actuator 12A, a second electric actuator 12B, a third electric actuator 12C, and a fourth electric actuator 12D. The first electric actuator 12A is disposed between the vehicle body BD and a right front wheel. The second electric actuator 12B is disposed between the vehicle body BD and a left front wheel. The third electric actuator 12C is disposed between the vehicle body BD and a right rear wheel. The fourth electric actuator 12D is disposed between the vehicle body BD and a left rear wheel.

The electric suspension control electronic control unit (ECU) 20 controls each of the first electric actuator 12A to the fourth electric actuator 12D. The electric suspension control ECU 20 is connected to each of the first electric actuator 12A to the fourth electric actuator 12D via a high voltage line 13, a signal line 14, and a low voltage line 15.

The high voltage line 13 supplies power of a high voltage VH from a battery 16 shown in FIG. 2 to each of the first electric actuator 12A to the fourth electric actuator 12D. The power of the high voltage VH is for use in driving a motor 46 shown in FIG. 2. The high voltage VH is, for example, in a range of from AC 33 V to 37 V.

The signal line 14 transmits detection signals of a sensor S1 to a sensor S4 shown in FIG. 2 to the electric suspension control ECU 20.

Description will be made as to the sensor S1 to the sensor S4 with reference to FIG. 2.

The low voltage line 15 supplies power of a low voltage VL from the battery 16 shown in FIG. 2 to each of the first electric actuator 12A to the fourth electric actuator 12D. The power of the low voltage is for use in actuating the sensor S1 to the sensor S4 shown in FIG. 2. The low voltage VL is, for example, DC 5 V.

In the following description, the electric suspension control ECU 20 may be described as the control ECU 20 for convenience.

The detection sensor SC detects outside of the vehicle 1. The detection sensor SC includes at least one of radar, a camera, LiDAR (light detection and ranging) and an ultrasonic sensor.

The detection sensor SC detects an obstacle, another vehicle, a human body, and the like outside the vehicle 1. The detection result of the detection sensor SC is transmitted to a collision determination ECU 70 shown in FIG. 2. A detection range DR indicates a range in which the detection sensor SC detects an object.

The first electric actuator 12A to the fourth electric actuator 12D include about the same configuration, and hence in a case where each of the first electric actuator 12A to the fourth electric actuator 12D is not distinguished, each of the first electric actuator 12A to the fourth electric actuator 12D may be described below simply as the electric actuator 12.

Next, description will be made as to a configuration of the electric actuator 12 with reference to FIG. 2.

As shown in FIG. 2, the electric actuator 12 includes a coupling part 30, an inner tube 32 and a nut 34 as members on a wheel TR side. Also, the electric actuator 12 includes an outer tube 40, a screw shaft 42, a bearing 44, and the motor 46 as members on a vehicle body BD side. The outer tube 40, the bearing 44 and the motor 46 are fixed to a chassis 48 disposed in a lower part of the vehicle body BD.

Description will be made as to a configuration of the motor 46 with reference to FIG. 3.

The motor 46 corresponds to an example of "a high voltage component".

The screw shaft 42 is supported by the bearing 44 and the nut 34. The nut 34 has an inner surface screwed into a screw groove formed in an outer surface of the screw shaft 42 via a bearing.

When the motor 46 rotates the screw shaft 42, the nut 34 is moved in an up-down direction. When moving the nut 34 downward, the inner tube 32 is moved downward. When moving the nut 34 upward, the inner tube 32 is moved upward.

Consequently, a position of the inner tube 32 in the up-down direction to the outer tube 40 fixed to the chassis 48 of the vehicle body BD can be adjusted.

The coupling part 30 is fixed to a knuckle (not shown) of the suspension apparatus, and is accordingly coupled to the wheel TR. When inputting vibration from the wheel TR side into the coupling part 30 and applying, for example, an upward acceleration α to the coupling part 30, the inner tube 32 and the nut 34 are raised integrally with the outer tube 40. In this case, the motor 46 rotates the screw shaft 42 to move the inner tube 32 in a direction to absorb the upward acceleration α, i.e., in an upward direction, so that vibration from the wheel TR to the vehicle body BD can be attenuated.

In the electric actuator 12, an acceleration sensor S1, a stroke sensor S2, a rotation angle sensor S3 and a voltage sensor S4 are arranged.

The acceleration sensor S1 is fixed to, for example, an outer circumferential surface of the inner tube 32, to detect the acceleration α applied from the wheel TR side to the coupling part 30.

The stroke sensor S2 is disposed at a position facing the screw shaft 42 of the inner tube 32, to detect a stroke ST indicating a downward moving amount of the nut 34. The stroke sensor S2 is composed of a distance measurement sensor or the like.

The rotation angle sensor S3 is composed of a so-called resolver, Hall element or the like, to detect a rotation angle θ of the motor 46.

The voltage sensor S4 detects a voltage V applied to the motor 46. In a state where the motor 46 is driven with the power from the battery 16, the voltage V indicates the high voltage VH supplied from the battery 16 through the high voltage line 13.

The acceleration α, the stroke ST, the rotation angle θ and the voltage V are outputted to the control ECU 20.

[2. Configuration of Electric Suspension Control ECU]

The control ECU 20 controls the motor 46 through an inverter 22, based on detection results of the acceleration sensor S1, the stroke sensor S2, the rotation angle sensor S3 and the voltage sensor S4.

Description will be made as to a configuration of the inverter 22 with reference to FIG. 3.

The control ECU 20 includes a memory 21A and a processor 21B.

The memory 21A is a storage device which stores, in a nonvolatile manner, a program to be executed by the processor 21B and data. The memory 21A is composed of a magnetic storage device, a semiconductor storage element such as a flash read only memory (ROM), or another type of nonvolatile storage device. Also, the memory 21A may include a random-access memory (RAM) included in a work area of the processor 21B. The memory 21A stores data to be processed by the control ECU 20, and a control program to be executed by the processor 21B.

The electric suspension control ECU 20 corresponds to an example of "a control device".

The processor 21B may be composed of a single processor, or a plurality of processors which function as the processor 21B. The processor 21B executes the control program to control each part of the electric suspension apparatus 10.

The control ECU 20 includes a limitation instruction unit 211 and a limitation release unit 212. Specifically, the processor 21B of the control ECU 20 executes the control program, to function as the limitation instruction unit 211 and the limitation release unit 212.

Also, the control ECU 20 is communicably connected to the collision determination ECU 70 and a running control ECU 80.

The collision determination ECU 70 determines whether a possibility of collision of the vehicle 1 is present, based on the detection result of the detection sensor SC. The collision determination ECU 70 outputs, to the control ECU 20, the determination result of whether the possibility of collision of the vehicle 1 is present.

The running control ECU 80 controls running of the vehicle 1. The running control ECU 80 outputs, to the control ECU 20, a running speed VC of the vehicle 1, a running time TC of the vehicle 1, and a running distance LC of the vehicle 1.

The collision determination ECU 70 corresponds to an example of "a collision determination device".

The limitation instruction unit 211 limits supply of power of the high voltage VH to the motor 46 of each of the first electric actuator 12A to the fourth electric actuator 12D, depending on the detection result of the collision determination ECU 70.

Specifically, in a case where the collision determination ECU 70 determines that the possibility of collision is present, the limitation instruction unit 211 executes processing as follows. That is, the limitation instruction unit 211, for example, limits a voltage supplied to the motor 46 to a predetermined voltage VA or less through a boosting circuit 26, also in a case where the power supplied to the motor 46 is stopped. The predetermined voltage VA is, for example, from 20 V to 30 V.

Further description will be made as to the boosting circuit 26 with reference to FIG. 3.

Also, the limitation instruction unit 211 short-circuits the motor 46 of each of the first electric actuator 12A to the fourth electric actuator 12D, after the supply of the power of the high voltage VH to the motor 46 is limited.

Specifically, the limitation instruction unit 211 stops the supply of the power to the motor 46 and short-circuits the motor 46 through the inverter 22.

Description will be made as to the configuration of the inverter 22 with reference to FIG. 3.

The limitation release unit 212 releases the short circuit of the motor 46 of each of the first electric actuator 12A to the fourth electric actuator 12D, in a case where the supply of the high voltage VH to the motor 46 is limited by the limitation instruction unit 211, and then a predetermined condition is satisfied. The predetermined condition is, for example, a condition indicating that the possibility of collision is eliminated.

Specifically, the predetermined condition is, for example, to satisfy at least one of a condition that the vehicle 1 runs at a predetermined vehicle speed VCA or more for a predetermined time TCA and a condition that the vehicle 1 runs a predetermined distance LCA, after the voltage supplied to the motor 46 is limited to the predetermined voltage VA or less. The limitation release unit 212 releases the short circuit of the motor 46 of each of the first electric actuator 12A to the fourth electric actuator 12D, by releasing the fixing of the on state of the inverter 22 through a drive circuit 24, in a case where the supply of the high voltage VH to the motor 46 is limited by the limitation instruction unit 211, and then the predetermined condition is satisfied.

Further, the limitation release unit 212 releases the limitation of the supply of the high voltage VH to the motor 46 of each of the first electric actuator 12A to the fourth electric actuator 12D, in a case where the supply of the high voltage VH to the motor 46 is limited by the limitation instruction unit 211, and then the predetermined condition is satisfied.

Specifically, in a case where at least one of the condition that the vehicle 1 runs at the predetermined vehicle speed VCA or more for the predetermined time TCA and the condition that the vehicle 1 runs the predetermined distance LCA is satisfied, the limitation release unit 212 releases the limitation of the supply of the high voltage VH to the motor 46 through the boosting circuit 26. In other words, the limitation release unit 212 instructs the boosting circuit 26 to supply the high voltage VH to the motor 46.

Figure 3:
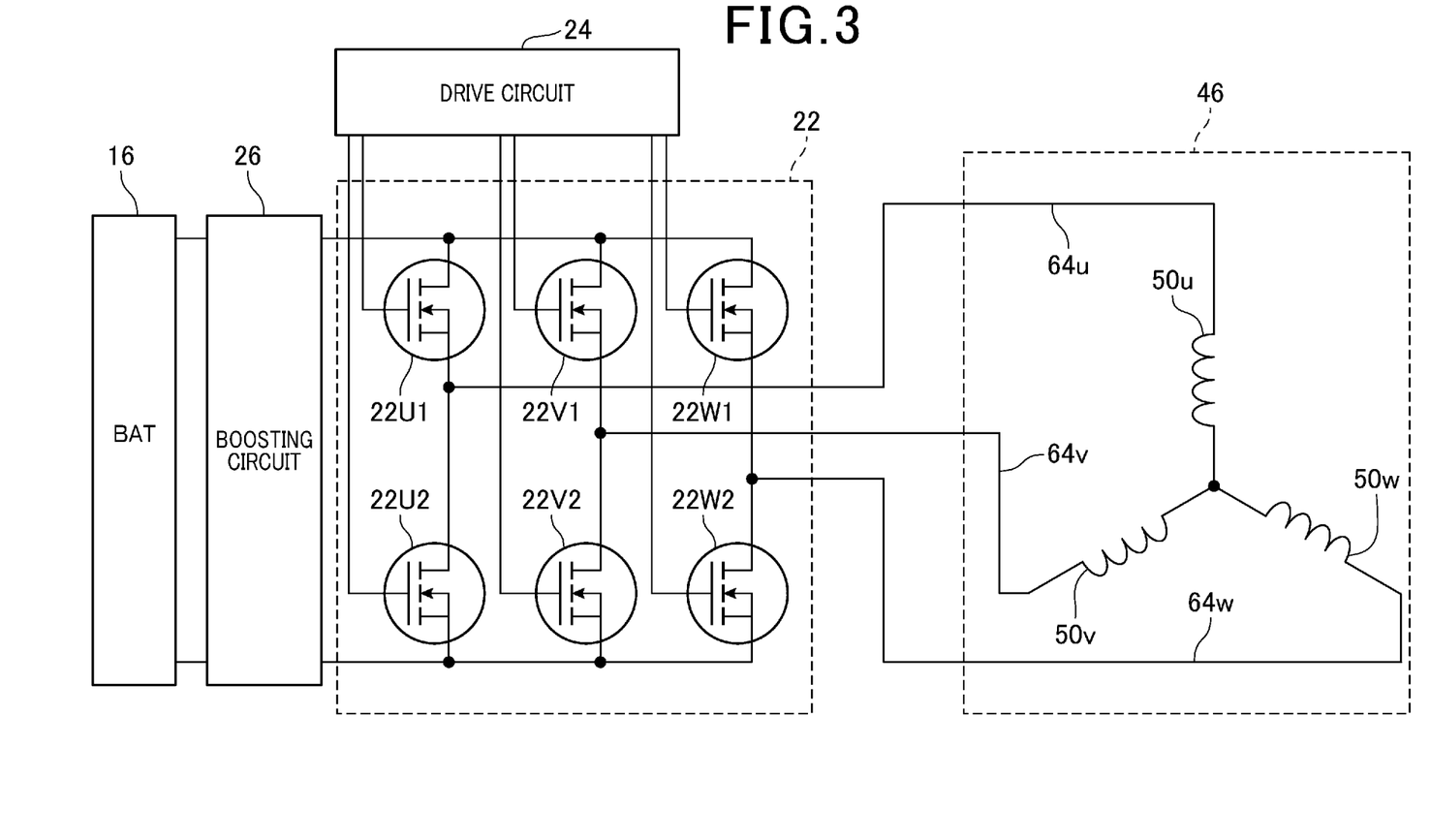
FIG. 3 is a diagram showing an example of a configuration of an inverter.

As shown in FIGS. 2 and 3, the boosting circuit 26 is disposed between the battery 16 and the inverter 22. The boosting circuit 26 boosts the voltage supplied from the battery 16 (e.g., from 12 V to 16 V) to the high voltage VH, and the high voltage VH is supplied to the inverter 22.

Also, the boosting circuit 26 limits the voltage supplied to the inverter 22 to the predetermined voltage VA or less, following an instruction from the limitation instruction unit 211. Further, the boosting circuit 26 follows an instruction from the limitation release unit 212 to return the voltage supplied to the inverter 22 from the predetermined voltage VA or less to the high voltage VH.

The battery 16 and the boosting circuit 26 correspond to an example of "a power source device".

[3. Configuration of Inverter]

The control ECU 20 controls the inverter 22 through the drive circuit 24. The control ECU 20 controls a rotation direction and a rotation speed of the motor 46 through the inverter 22. Also, the control ECU 20 short-circuits the motor 46, for example, by fixing the inverter 22 in the on state.

FIG. 3 is a diagram showing an example of the configuration of the inverter 22.

As shown in FIG. 3, the inverter 22 includes a metal-oxide-semiconductor field effect transistor (MOSFET) 22U1, a MOSFET 22U2, a MOSFET 22V1, a MOSFET 22V2, a MOSFET 22W1, and a MOSFET 22W2. Each of these six MOSFETs turns on and off based on an instruction from the control ECU 20.

The motor 46 is, for example, a three-phase AC brushless motor, and includes three motor coils $50u$, $50v$, and $50w$ as shown in FIG. 3.

The motor 46 rotationally drives the screw shaft 42 shown in FIG. 2 with the power supplied from the battery 16 through the inverter 22.

The limitation instruction unit 211 of the control ECU 20 short-circuits the motor 46 by fixing, in the on state, three MOSFETs on a low side of the inverter 22, i.e., the MOSFET 22U2, the MOSFET 22V2 and the MOSFET 22W2.

Also, the limitation instruction unit 211 of the control ECU 20 stops supply of power from the battery 16 to the motor 46, by fixing, in an off state, three MOSFETs on a high side of the inverter 22, i.e., the MOSFET 22U1, the MOSFET 22V1 and the MOSFET 22W1.

Note that the limitation instruction unit 211 may fix three MOSFETs on the high side in the off state, and then fix three MOSFETs on the low side in the on state.

The limitation release unit 212 of the control ECU 20 releases the short circuit of the motor 46, by releasing the fixing of the on state of three MOSFETs on the low side of the inverter 22, i.e., the MOSFET 22U2, the MOSFET 22V2 and the MOSFET 22W2.

Also, the limitation release unit 212 of the control ECU 20 releases the stop of the supply of the power from the battery 16 to the motor 46, by releasing the fixing of the off state of the three MOSFETs on the high side of the inverter 22, i.e., the MOSFET 22U1, the MOSFET 22V1 and the MOSFET 22W1.

Note that the limitation release unit 212 may release the fixing of the on state of the three MOSFETs on the low side, and then release the fixing of the off state of the three MOSFETs on the high side.

[4. Processing of Control ECU]

Figure 4:
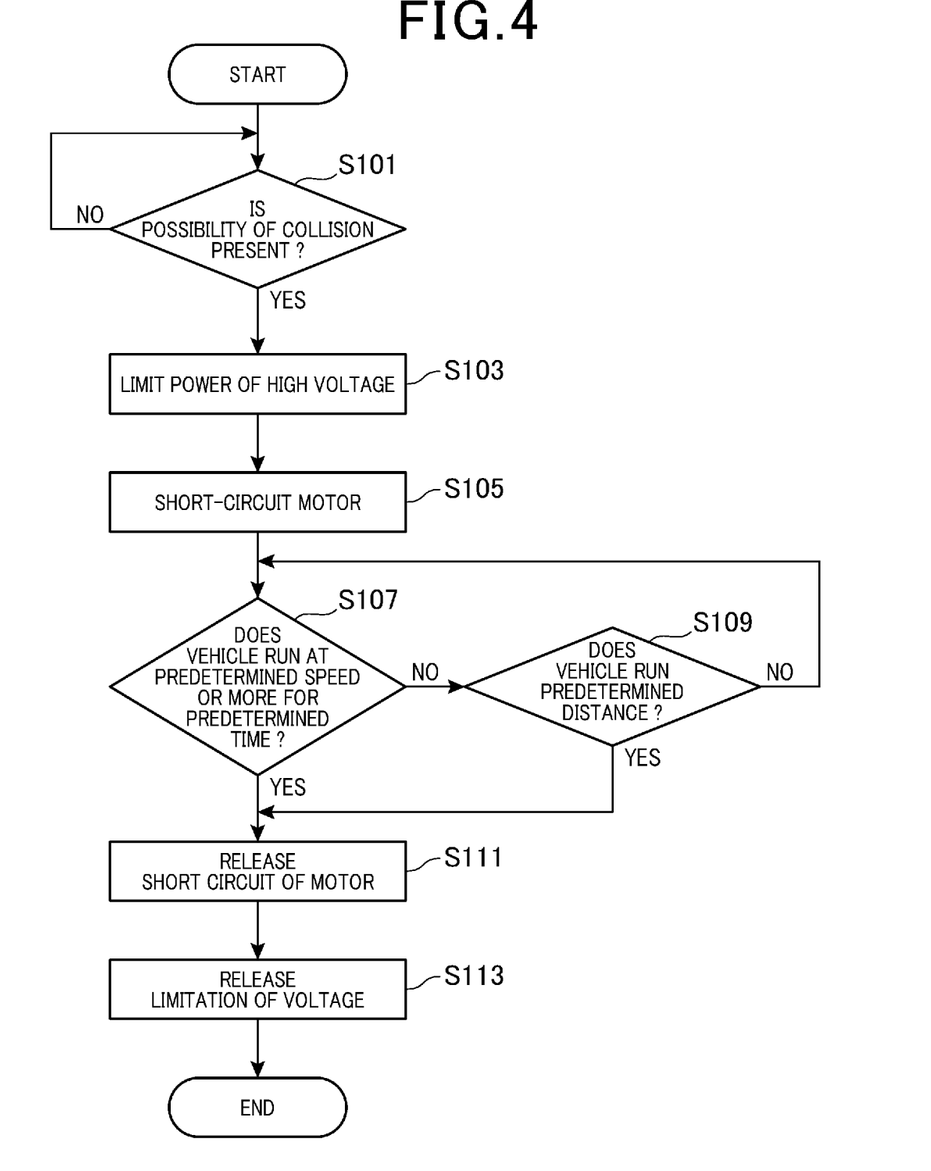
FIG. 4 is a flowchart showing an example of processing of a control ECU.

FIG. 4 is a flowchart showing an example of processing of the electric suspension control ECU 20.

First, the limitation instruction unit 211 determines in step S101 whether a possibility of collision is present, based on the detection result of the collision determination ECU 70.

In a case where the limitation instruction unit 211 determines that the possibility of collision is not present (NO in step S101), processing is in a standby state. In a case where the limitation instruction unit 211 determines that the possibility of collision is present (YES in step S101), the processing advances to step S103.

Then, in the step S103, the limitation instruction unit 211 limits the voltage supplied to the motor 46 of each of the first electric actuator 12A to the fourth electric actuator 12D to the predetermined voltage VA or less through the boosting circuit 26, also in a case where power supplied to the motor 46 is stopped.

Next, in step S105, the limitation instruction unit 211 short-circuits the motor 46 of each of the first electric actuator 12A to the fourth electric actuator 12D.

Next, the limitation release unit 212 determines in step S107 whether the vehicle 1 runs at the predetermined vehicle speed VCA or more for the predetermined time TCA, after the voltage supplied to the motor 46 is limited to the predetermined voltage VA or less in the step S103.

In a case where the limitation release unit 212 determines that the vehicle 1 runs at the predetermined vehicle speed VCA or more for the predetermined time TCA (YES in step S107), the processing advances to step S111. In a case where the limitation release unit 212 determines that the vehicle 1 does not run at the predetermined vehicle speed VCA or more for the predetermined time TCA (NO in step S107), the processing advances to step S109.

Then, the limitation release unit 212 determines in the step S109 whether the vehicle 1 runs the predetermined distance LCA, after the voltage supplied to the motor 46 is limited to the predetermined voltage VA or less in the step S103.

In a case where the limitation release unit 212 determines that the vehicle 1 does not run the predetermined distance LCA (NO in step S109), the processing returns to the step S107. In a case where the limitation release unit 212 determines that the vehicle 1 runs the predetermined distance LCA (YES in step S109), the processing advances to the step S111.

Then, in the step S111, the limitation release unit 212 releases the short circuit of the motor 46 of each of the first electric actuator 12A to the fourth electric actuator 12D.

Next, in step S113, the limitation release unit 212 releases the limitation of the supply of the high voltage VH to the motor 46 of each of the first electric actuator 12A to the fourth electric actuator 12D. Afterward, the processing ends.

As described with reference to FIG. 4, in the case where it is determined that the possibility of collision is present, the voltage supplied to the motor 46 is limited to the predetermined voltage VA or less, so that safety of the motor 46 can be improved.

Also, in the case where it is determined that the possibility of collision is present, the motor 46 is short-circuited, so that regenerative power is generated in the motor 46, and the motor 46 can be provided with a braking force. Therefore, an operation of the electric actuator 12 included in the electric suspension apparatus 10 can be regulated.

Further, in a case where the vehicle 1 runs at the predetermined vehicle speed VCA or more for the predetermined time TCA, or the vehicle 1 runs the predetermined distance LCA, it can be presumed that the possibility of collision is eliminated. Consequently, the short circuit of the motor 46 is released, and the limitation of the supply of the high voltage VH to the motor 46 is released. Therefore, vibration from the wheel TR to the vehicle body BD can be damped by the electric actuator 12.

[5. Configurations and Effects]

As described above, a vehicle 1 according to the present embodiment includes a collision determination ECU 70 determining whether a possibility of collision is present, based on a detection result of a detection sensor SC detecting outside of the vehicle 1, a high voltage component (e.g., motor 46), a battery 16 and a boosting circuit 26 supplying a high voltage VH to the high voltage component, and an electric suspension control ECU 20 controlling the boosting circuit 26 and the high voltage component, wherein in a case where the collision determination ECU 70 determines that the possibility of collision is present, the electric suspension control ECU 20 limits the supply of the high voltage VH to the high voltage component.

According to this configuration, in the case where the collision determination ECU 70 determines that the possibility of collision is present, the electric suspension control ECU 20 limits the supply of the high voltage VH to the high voltage component (e.g., motor 46), so that safety of the high voltage component can be improved.

Also, in the case where the collision determination ECU 70 determines that the possibility of collision is present, the electric suspension control ECU 20 limits a voltage supplied to the high voltage component (e.g., motor 46) to a predetermined voltage or less.

According to this configuration, in the case where it is determined that the possibility of collision is present, the voltage supplied to the high voltage component is limited to the predetermined voltage or less, so that the safety of the high voltage component (e.g., motor 46) can be improved.

Further, the high voltage component is a motor 46 driving an electric actuator 12 in an electric suspension apparatus 10, and the electric suspension control ECU 20 short-circuits the motor 46, after supply of the high voltage VH to the motor 46 is limited.

According to this configuration, in the case where it is determined that the possibility of collision is present, the supply of the high voltage VH to the motor 46 is limited, and then the motor 46 is short-circuited, so that regenerative power is generated in the motor 46, and the motor 46 can be provided with a braking force. Therefore, an operation of the electric actuator 12 included in the electric suspension apparatus 10 can be regulated.

Additionally, the electric suspension control ECU 20 releases the limitation of the supply of the high voltage VH to the motor 46, in a case where the supply of the high voltage VH to the motor 46 is limited, and then a predetermined condition is satisfied.

According to this configuration, the limitation of the supply of the high voltage VH to the motor 46 can be appropriately released by appropriately setting the predetermined condition. The predetermined condition is, for example, a condition indicating that the possibility of collision is eliminated.

Also, the predetermined condition includes at least one of a condition that the vehicle 1 runs at a predetermined vehicle speed VCA or more for a predetermined time TCA and a condition that the vehicle 1 runs a predetermined distance LCA.

Therefore, the predetermined condition can be appropriately set. Therefore, the limitation of the supply of the high voltage VH to the motor 46 can be appropriately released.

6. Another Embodiment

Note that the present invention is not limited to the above configuration of the embodiment, and the invention can be implemented in various aspects without departing from the scope of the invention.

For example, the above embodiment describes but is not limited to the case where "the high voltage component" is the electric actuator 12. "The high voltage component" may be one of an in-wheel motor, an air conditioner, a running motor, and an electric stabilizer.

Also, the above embodiment describes but is not limited to the case where "the power source device" includes the battery 16 and the boosting circuit 26. "The power source device" may be a power generator such as an alternator.

Further, the above embodiment describes the case where the high voltage VH is supplied through the boosting circuit 26, but the high voltage VH may be supplied directly from the battery of the high voltage VH without using the boosting circuit 26.

Additionally, the high voltage VH may be supplied from the battery of the high voltage through a step-down circuit.

Additionally, the above embodiment describes, but is not limited to the case where the electric suspension apparatus 10 includes the first electric actuator 12A to the fourth electric actuator 12D. For example, the electric suspension apparatus 10 may include the third electric actuator 12C and the fourth electric actuator 12D, and the apparatus does not have to include the first electric actuator 12A and the second electric actuator 12B. Conversely, the electric suspension apparatus 10 may include the first electric actuator 12A and the second electric actuator 12B, and the apparatus does not have to include the third electric actuator 12C and the fourth electric actuator 12D.

Additionally, it has been described in the above embodiment that the electric actuator 12 includes the acceleration sensor S1, the stroke sensor S2, the rotation angle sensor S3, and the voltage sensor S4, but the voltage sensor S4 may be omitted.

Also, the above embodiment describes but is not limited to the case where the limitation instruction unit 211 short-circuits the motor 46 by fixing, in the off state, three MOSFETs on the high side of the inverter 22, and fixing, in the on state, three MOSFETs on the low side. For example, the electric suspension apparatus 10 may include a short circuit short-circuiting the motor 46, and the limitation instruction unit 211 may short-circuit the motor 46 through the short circuit.

Furthermore, in a case where the electric actuator 12 cannot continue to be normally controlled in a state where the voltage supplied to the motor 46 is limited to the predetermined voltage VA or less, it is necessary to short-circuit the motor 46 as described above. However, in a case where the electric actuator 12 can continue to be normally controlled in the state where the voltage supplied to the motor 46 is limited to the predetermined voltage VA or less, the motor 46 does not have to be short-circuited.

At least part of the respective functional blocks shown in FIG. 2 may be achieved in hardware, or in hardware and software, and is not limited to a configuration to arrange independent hardware resources as shown in the drawing.

The control program executed by the processor 21B of the electric suspension control ECU 20 of the electric suspension apparatus 10 is stored in the memory 21A, but the control program may be stored in an external HDD or the like.

The processing units shown in the flowchart of FIG. 4 are divided depending on main processing content, to facilitate understanding of the processing of the electric suspension control ECU 20 of the electric suspension apparatus 10. The embodiment is not limited by a dividing method or name of the processing unit shown in the flowchart of FIG. 4. The processing of the electric suspension control ECU 20 may be divided into much more processing units depending on processing content, and one processing unit may be divided to include further processing. The above processing order in the flowchart is not limited to the shown example.

A control method of the electric suspension control ECU 20 can be achieved by allowing the processor 21B of the electric suspension control ECU 20 to execute a control program corresponding to the control method of the electric suspension control ECU 20. The control program can be recorded in advance in a computer readable recording medium. As the recording medium, a magnetic or optical recording medium or a semiconductor memory device may be used. Specifically, examples of the recording medium include a portable recording medium such as a flexible disk, a compact disk read only memory (CD-ROM), a digital versatile disc (DVD), Blue-ray (registered trademark) disc, a magneto-optic disk, a flash memory, or a card recording medium, and a fixed recording medium. The recording medium may be a nonvolatile storage device such as RAM, ROM, HDD, or another internal storage device included in the electric suspension apparatus 10. The control method of the electric suspension control ECU 20 may be achieved by storing the control program corresponding to the control method of the electric suspension control ECU 20 in a server device or the like, and by downloading the control program from the server device to the electric suspension control ECU 20.

7. Configurations Supported by the Above Embodiment

The above embodiment supports the following configurations.

(Configuration 1)

A vehicle including a collision determination device determining whether a possibility of collision is present, based on a detection result of a detection sensor detecting outside of the vehicle, a high voltage component, a power source device supplying a high voltage to the high voltage component, and a control device controlling the power source device and the high voltage component, wherein in a case where the collision determination device determines that the possibility of collision is present, the control device limits the supply of the high voltage to the high voltage component.

According to the vehicle of configuration 1, in the case where it is determined that the possibility of collision is present, the supply of the high voltage to the high voltage component is limited, so that safety of the high voltage component can be improved.

(Configuration 2)

The vehicle according to configuration 1, wherein in the case where the collision determination device determines that the possibility of collision is present, the control device limits a voltage supplied to the high voltage component to a predetermined voltage or less.

According to the vehicle of configuration 2, in the case where it is determined that the possibility of collision is present, the voltage supplied to the high voltage component is limited to the predetermined voltage or less, so that the safety of the high voltage component can be improved.

(Configuration 3)

The vehicle according to configuration 1 or 2, wherein the high voltage component is a motor driving an electric actuator in an electric suspension apparatus, and the control device short-circuits the motor, after supply of the high voltage to the motor is limited.

According to the vehicle of configuration 3, the high voltage component is the motor driving the electric actuator in the electric suspension apparatus, and in the case where it is determined that the possibility of collision is present, the supply of the high voltage to the motor is limited, and then the motor is short-circuited. Consequently, regenerative power is generated in the motor, and the motor can be provided with a braking force. Therefore, an operation of the electric actuator included in the electric suspension apparatus can be regulated.

(Configuration 4)

A vehicle according to any one of configurations 1 to 3, wherein the control device releases the limitation of the supply of the high voltage to the high voltage component, in a case where the supply of the high voltage to the high voltage component is limited, and then a predetermined condition is satisfied.

According to the vehicle of configuration 4, the limitation of the supply of the high voltage to the high voltage component is released, in the case where the supply of the high voltage to the high voltage component is limited, and then the predetermined condition is satisfied. Therefore, the limitation of the supply of the high voltage to the high voltage component can be appropriately released by appropriately setting the predetermined condition. The predetermined condition is, for example, a condition indicating that the possibility of collision is eliminated.

(Configuration 5)

The vehicle according to configuration 4, wherein the predetermined condition includes at least one of a condition that the vehicle runs at a predetermined vehicle speed or more for a predetermined time and a condition that the vehicle runs a predetermined distance.

According to the vehicle of configuration 5, the predetermined condition includes at least one of the condition that the vehicle runs at the predetermined vehicle speed or more for the predetermined time and the condition that the vehicle runs the predetermined distance. In a case where the supply of the high voltage to the high voltage component is limited, and then the vehicle runs at the predetermined vehicle speed or more for the predetermined time, it can be presumed that the possibility of collision is eliminated. Also, in a case where the supply of the high voltage to the high voltage component is limited, and then the vehicle runs at the predetermined distance, it can be presumed that the possibility of collision is eliminated. Therefore, the predetermined condition can be appropriately set.

REFERENCE SIGNS LIST

1 . . . vehicle, 10 . . . electric suspension apparatus, 12 . . . electric actuator, 12A . . . first electric actuator, 12B . . . second electric actuator, 12C . . . third electric actuator, 12D . . . fourth electric actuator, 13 . . . high voltage line, 14 . . . signal line, 15 . . . low voltage line, 16 . . . battery (part of power source device), 20 . . . electric suspension control ECU (control device), 21A . . . memory, 21B . . . processor, 211 . . . limitation instruction unit, 212 . . . limitation release unit, 22 . . . inverter, 22U1, 22U2, 22V1, 22V2, 22W1 and 22W2 . . . MOSFET, 24 . . . drive circuit, 26 . . . boosting circuit (part of power source device), 30 . . . coupling part, 32 . . . inner tube, 34 . . . nut, 40 . . . outer tube, 42 . . . screw shaft, 44 . . . bearing, 46 . . . motor (high voltage component), 50$u$, 50$v$ and 50$w$ . . . motor coil, 64$u$, 64$v$ and 64$w$ . . . power line, 70 . . . collision determination ECU (collision determination device), 80 . . . running control ECU, BD . . . vehicle body, S1 . . . acceleration sensor, S2 . . . stroke sensor, S3 . . . rotation angle sensor, S4 . . . voltage sensor, SC . . . detection sensor, ST . . . stroke, TR . . . wheel, V . . . voltage, LC . . . running distance, LCA . . . predetermined distance, VC . . . running speed, VCA . . . predetermined speed, TC . . . running time, TCA . . . predetermined time, α . . . acceleration, θ . . . rotation angle

What is claimed is:

1. A vehicle comprising:
a collision determination device having a first processor that determines whether a possibility of collision between the vehicle and an obstacle is present, based on a detection result of a detection sensor detecting the obstacle outside of the vehicle;
a high voltage component which is a motor for driving an electric actuator in an electric suspension apparatus;
a power source device for supplying a high voltage to the high voltage component, the high voltage being used for driving the high voltage component; and
a control device having a second processor that controls the power source device and the high voltage component, wherein
the power source device includes a battery and a boosting circuit that boosts a voltage supplied from the battery to the high voltage component, and
in a case where the first processor of the collision determination device determines that the possibility of collision is present, the second processor of the control device limits the supply of the high voltage to the high voltage component by controlling the boosting circuit to set the voltage to be supplied to the high voltage component to a predetermined voltage or lower.

2. The vehicle according to claim 1, wherein the second processor of the control device short-circuits the motor, after supply of the high voltage to the motor is limited.

3. The vehicle according to claim 1, wherein the second processor of the control device releases limitation of the supply of the high voltage to the high voltage component, in a case where the supply of the high voltage to the high voltage component is limited, and then a predetermined condition is satisfied.

4. The vehicle according to claim 3, wherein the predetermined condition includes at least one of a condition that the vehicle runs at a predetermined vehicle speed or more for a predetermined time and a condition that the vehicle runs a predetermined distance.

5. The vehicle according to claim 1, wherein the high voltage is 33V to 37V.

6. The vehicle according to claim 1, wherein the voltage supplied from the battery is 12V to 16V.

7. The vehicle according to claim 1, wherein the predetermined voltage is 20V to 30V.

* * * * *